C. E. A. THOMPSON.
POWER MOLDING MACHINE.
APPLICATION FILED DEC. 12, 1908.

1,016,530.

Patented Feb. 6, 1912.

C. E. A. THOMPSON.
POWER MOLDING MACHINE.
APPLICATION FILED DEC. 12, 1908.

1,016,530.

Patented Feb. 6, 1912.

Witnesses:
H. C. H. Lamb
S. W. Atherton

Inventor
C. Edwin A. Thompson
By Attorney
A. W. Wooster

COLUMBIA PLANOGRAPH CO., WASHINGTON, D. C.

UNITED STATES PATENT OFFICE.

CHARLES EDWIN A. THOMPSON, OF BRIDGEPORT, CONNECTICUT, ASSIGNOR TO THE BRIDGEPORT FOUNDRY AND MACHINE COMPANY, OF BRIDGEPORT, CONNECTICUT, A CORPORATION OF CONNECTICUT.

POWER MOLDING-MACHINE.

1,016,530.  Specification of Letters Patent.  Patented Feb. 6, 1912.

Application filed December 12, 1908. Serial No. 467,218.

*To all whom it may concern:*

Be it known that I, CHARLES EDWIN A. THOMPSON, a citizen of the United States, residing at Bridgeport, county of Fairfield, State of Connecticut, have invented a new and useful Power Molding-Machine, of which the following is a specification.

This invention has for its object to provide a molding machine in which both the ramming and the lifting of the flask shall be performed by steam or pneumatic power, preferably pneumatic power as the moisture of steam is thereby avoided, and which shall be so constructed that the flask is raised with perfect smoothness and without the slightest variation from perfect parallelism, thereby avoiding danger of the slightest injury to the molds.

With these and other objects in view I have devised the novel molding machine of which the following description in connection with the accompanying drawings is a specification, reference characters being used to indicate the several parts.

Fig. 5ª a detail view on the line 5ª—5ª in Fig. 7, looking in the direction of the arrows.

20 denotes framework by which the operative parts of the machine are carried and which may be of any ordinary or preferred construction.

Figure 6:
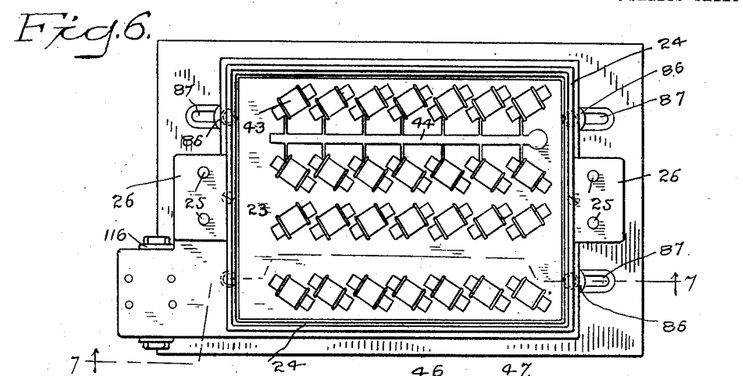
Fig. 6 a plan view of the table, flask frame, flask, pattern plate and patterns, corresponding with Fig. 7.

21 denotes the table, 22 the flask frame, which is secured thereto in any suitable manner as by screws (see dotted lines Fig. 6), 23 the pattern plate which lies in a recess in the top of the flask frame and 24 a flask resting upon the flask frame. The flask is retained in place by means of dowel pins 25 which engage holes in plates 26 extending from the ends of the flask.

27 denotes the ramming board which is secured to a straining bar 28. The straining bar and ramming board are adjustably secured to threaded side bars 29 by means of nuts 30. The lower ends of the straining bars are pivoted to the framework as at 31.

32 denotes sleeves which oscillate on studs (see dotted lines Figs. 1 and 3) which project from hubs 33 on the framework.

34 denotes arms which project upward from the sleeves, 35 arms which project rearward therefrom and 36 arms which project downward therefrom. Arms 34 carry rollers 37 which engage the side bars from the rear, the lower portion of the side bars being shown as squared and the rollers being correspondingly shaped to engage them and being provided with side flanges 38 bearing on the sides of the bars. Arms 35 are provided with projections 39 carrying set screws 40 which engage the front of the side bars and serve as stops to limit the movement of the side bars when returned to their normal position (see Fig. 5 in connection with Figs. 1 and 2). Arms 36 carry weights 41 which are adjustable thereon by means of set screws 42. These weights serve to retain the side bars in a vertical position and consequently to retain the straining bar and ramming board in a horizontal position and also serve as a counterbalance for the straining bar and ramming board in swinging the side bars, straining bar and ramming board backward, as indicated by dotted lines in Fig. 2, it being understood of course that each time a flask is filled with sand the straining bar and mold board are pushed backward out of the way. The exact vertical position of the side bars and consequently the horizontal position of the straining bar and ramming board is secured by adjustment of set screws 40, and the required counterbalancing of the straining bar and ramming board is secured by moving the weights upward or downward, as required, on arms 36 and locking them in position after adjustment by set screws 42.

43 denotes patterns secured in any suitable manner to the pattern plate, 44 runners and 45 sand in the flask.

46 denotes a mold board resting on the sand and provided on its under side with a projection 47 which marks the place in the sand for the insertion of a tube to form a pouring hole as is customary in the operation of casting.

Upon the under side of the table and preferably formed integral therewith is the ramming cylinder 48. The table itself forms the upper head of the cylinder and the lower head thereof is a plate 49 which is bolted thereto and is provided with a hub 50 which normally rests on a hub 51 cast integral with the framework or a portion thereof.

52 denotes the ramming piston rod which has a slide fit in hub 50, is shouldered to engage the top of hub 51 and extends into hub 51 where it is locked by a set screw 53. At the upper end of the piston rod is a piston 54 carrying a flexible washer 55 having a flange 56 which closely engages the wall of the cylinder. The washer is secured to the piston by means of a ring-shaped follower 57 secured to the piston by means of screws (see dotted lines Fig. 7). The edge of the follower is provided with a circumferential groove 58 which receives an outwardly expanding spring ring 59 which bears against the washer to retain it closely in engagement with the wall of the piston.

The upper head of the cylinder, i. e. the table, is provided with a central hole 60 which is closed by a screw plug 61. This hole in the table is for convenience in casting and also serves as an oil hole to oil the piston.

Figure 7:
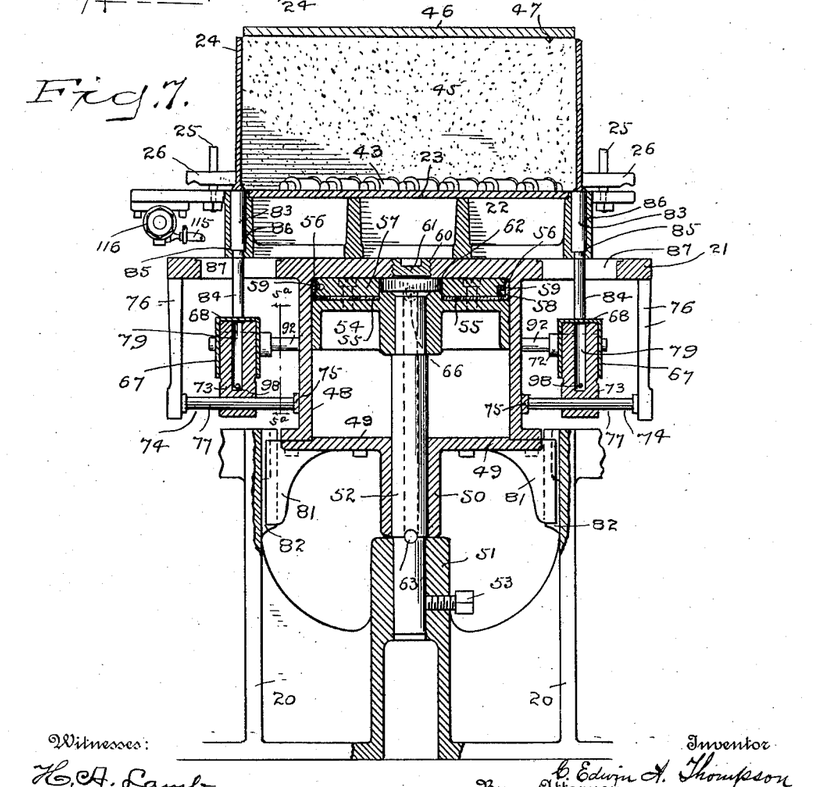
Fig. 7 a vertical section on the line 7—7 in Fig. 6, looking in the direction of the arrows.

The piston rod is provided with a longitudinal bore indicated by dotted lines in Fig. 7, the upper end of which terminates in a recess 62 within the ring-shaped follower and the lower end of which terminates in a lateral hole 63.

Figure 1:
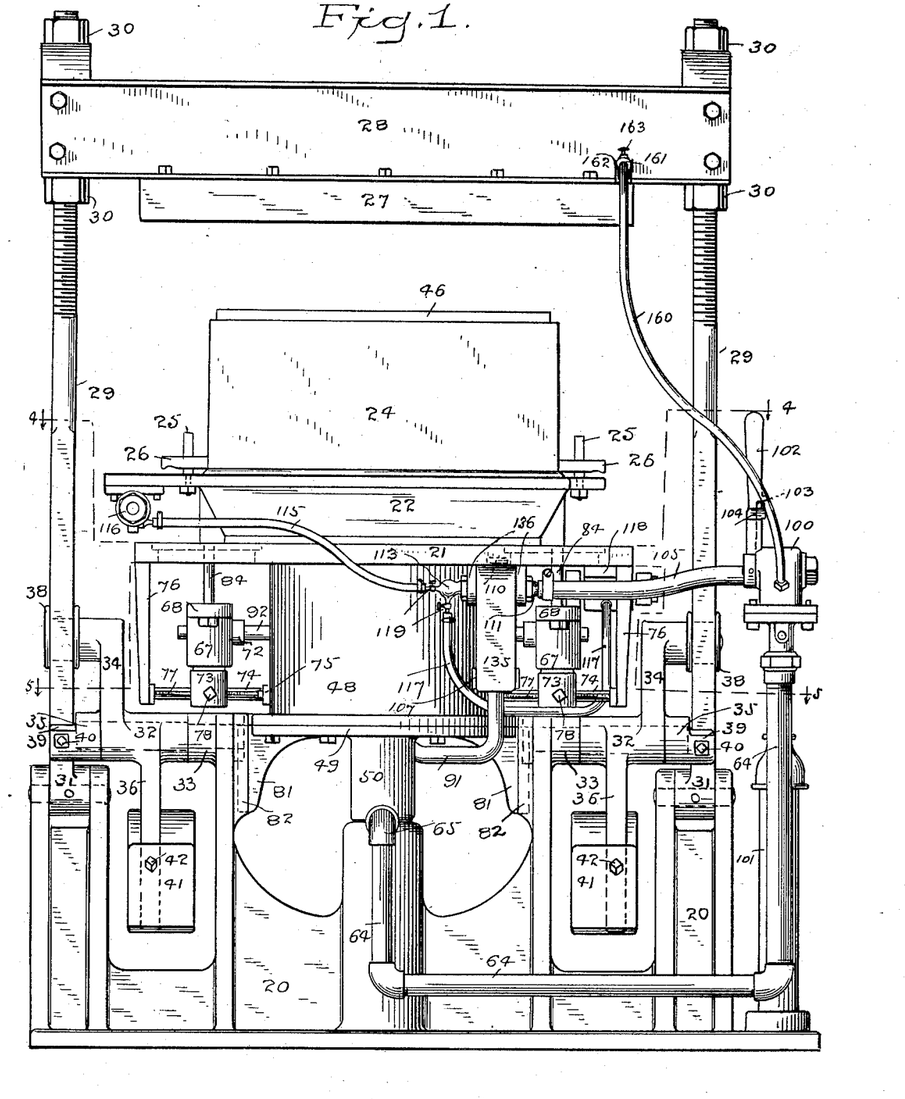
Figure 1 is a front elevation of the machine complete.

Air is supplied to raise the ramming cylinder, table and parts carried thereby by means of an air pipe 64 having a connection 65 to the piston rod (see Fig. 1). The exhaust from recess 62 is through an opening 66 in the cylinder (see Figs. 7 and 3). 81 denotes ribs which are cast integral with or rigidly secured to plate 49, which forms the lower head of the ramming cylinder, and engage ways 82 formed in the framework. The function of these ribs and ways is to steady the ramming cylinder and to prevent binding of the cylinder upon the piston.

67 denotes the lifting cylinders which are located on opposite sides of the ramming cylinder. Each lifting cylinder is provided at its upper end with an elongated head 68 having webs 69 on the under side thereof.

Figure 3:
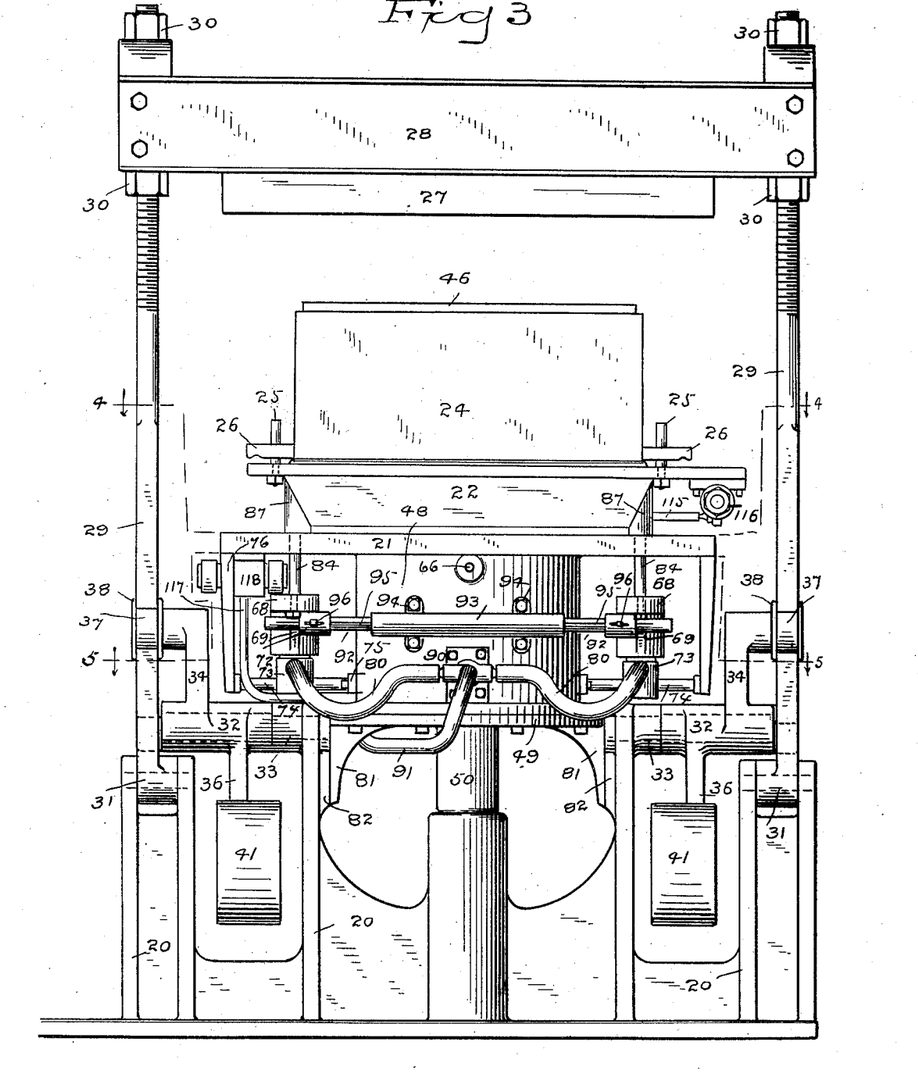
Fig. 3 a rear elevation.
Figure 4:
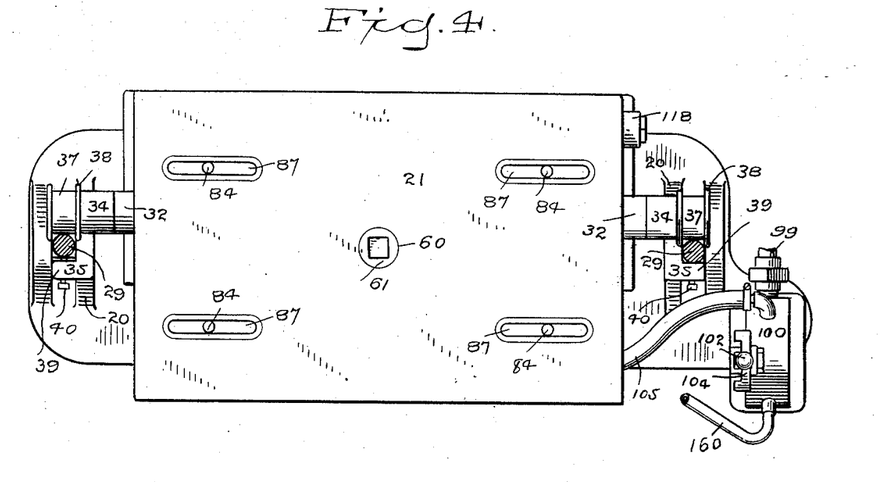
Fig. 4 a horizontal section on the line 4—4 in Figs. 1 and 3, looking in the direction of the arrows, the same being a plan view of the table.
Figure 5:
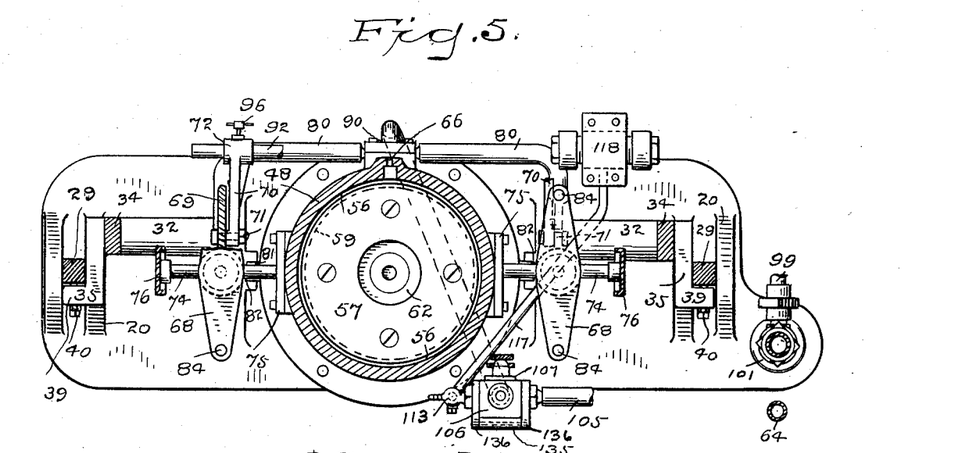
Fig. 5 a horizontal section on the line 5—5 in Figs. 1 and 3, partly broken away, looking in the direction of the arrows.
Figure 5A:
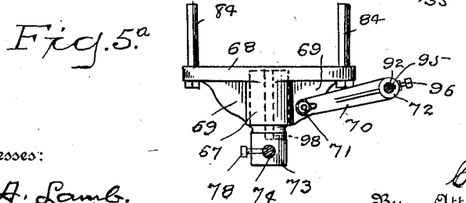

70 denotes arms pivoted by means of slotted connections to the webs, as at 71, and having at their outer ends hubs 72 which are adapted to slide laterally on a rock shaft 92 mounted in a carrier 93 secured to the ramming cylinder in any suitable manner as by ears 94 which are bolted to the cylinder (see Figs. 3, 5 and 5ᵃ). The rock shaft is provided with a groove 95 which is engaged by feathers in the hubs to lock them against other than lateral movement on the rock shaft. The hubs are adjustably locked against lateral movement on the rock shaft by means of set screws 96.

73 denotes the lifting pistons which are laterally adjustable on bars 74 which pass through the lower ends of the pistons. One end of each bar is provided with a cross piece 75 which is bolted to a boss on the side of the ramming cylinder. The other end of each bar 74 is rigidly secured in any suitable manner to an arm 76 which is rigidly secured to or cast integral with the table and extends downward therefrom. Each of the bars is provided with a groove 77 which is engaged by a feather (not shown) in the corresponding piston. The pistons are locked rigidly in position on the bars by means of set screws 78 (see Fig. 1). The function of the grooves and feathers is to insure perfect vertical alinement of the pistons and cylinders and thereby to prevent the pistons from binding the cylinders. The pistons are provided with central bores 79 which are intersected by lateral holes 98 and air is admitted thereto by means of pipes 80 which are connected to the pistons in alinement with holes 98, (see Fig. 3 in connection with Fig. 7). The flask is lifted from the flask frame and pattern plate, which remains stationary, by means of two-part lifting pins.

83 denotes the upper parts of the lifting pins and 84 the lower parts of the lifting pins. The upper parts 83 of these pins are provided with shoulders 85 and lie in shouldered sockets 86 in the flask frame. The upper ends of parts 83 lie flush with the upper surface of the flask frame and the pattern plate and the lower ends thereof lie flush with the under side of the flask frame. Parts 84 of the lifting pins are rigidly secured to the heads 68 of the lifting cylinders and the upper ends thereof extend through slots 87 in the table and register with the lower ends of parts 83. The weight of the flask normally rests upon the flask frame, the function of sockets 86 being simply to prevent the upper parts of the lifting pins from dropping out when the flask frame is removed. The slots in the table are provided in order to permit ample adjustment of the lifting cylinders and pistons to correspond with different sizes of flask frames, it being understood of course that the flask frames and flasks must correspond in order to have the lifting pins register with the end walls of the flask, as clearly shown in Fig. 7.

It is a vitally important feature of the present invention that the flask is lifted from the pattern plate in perfect vertical alinement and with perfect smoothness in order to prevent the possibility of injury to the molds. In my present machine, this result is perfectly accomplished by steam or pneumatic power. The air is supplied to a central coupling 90, shown as secured to the rear of the ramming cylinder, by means of a pipe 91 leading from the lifting valve (see Figs. 3 and 8). From this coupling the air passes in opposite directions through pipes 80 to the lifting cylinders, the air pressure of course being equal in both pipes. Should the air pressure in the two lifting cylinders not be exactly equal, however, any inequality in pressure is overcome and the cylinders caused to rise with perfect smoothness and regularity by means of arms 70 and the rock shaft which insure perfectly uniform movement of the two cylinders. It will be understood that when the ramming cylinder is raised the lifting cylinders rise with it, but in the lifting operation the ramming cylinder remains stationary.

Figure 2:
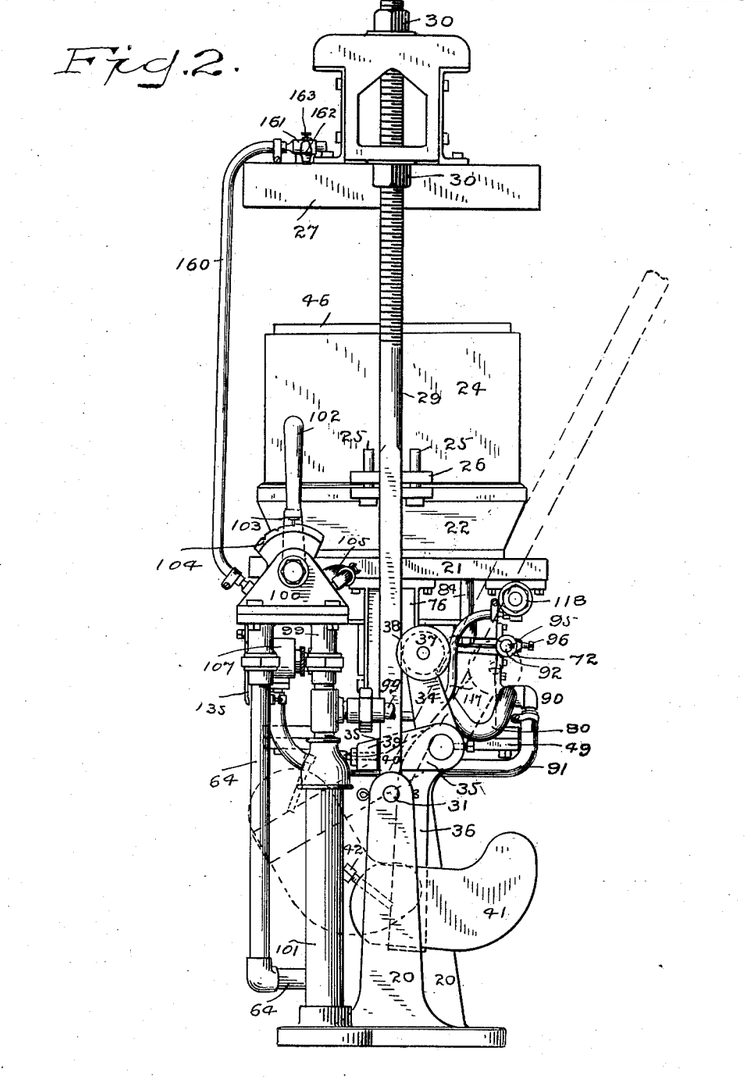
Fig. 2 a side elevation as seen from the right in Fig. 1.

Air may be supplied to the machine by means of a pump or a compressed air reservoir. A pipe 99 from the source of supply admits air to a chamber 100 which is supported by a standard 101. Air pipe 64 leads from this chamber to the ramming cylinder, as already explained. The passage of air from the chamber to pipe 64 is controlled by a valve within the chamber whose operating lever 102 normally stands vertically as in Figs. 1 and 2. The lever is locked in any required position by means of a suitable catch 103 adapted to engage either of the notches of a segment 104. When the catch is in engagement with the first notch as in Fig. 2, no air can pass to the ramming cylinder. To lift the ramming cylinder, flask frame and parts carried thereby, the operator swings the lever over toward the front, that is toward the left as seen in Fig. 2. If the catch is placed in the second notch, a reduced quantity of air passes to the cylinder and produces a relatively slow and soft ramming operation. If the catch is placed in engagement with the third notch, it produces a relatively quick and hard ramming operation, as will be readily understood.

Figure 8:
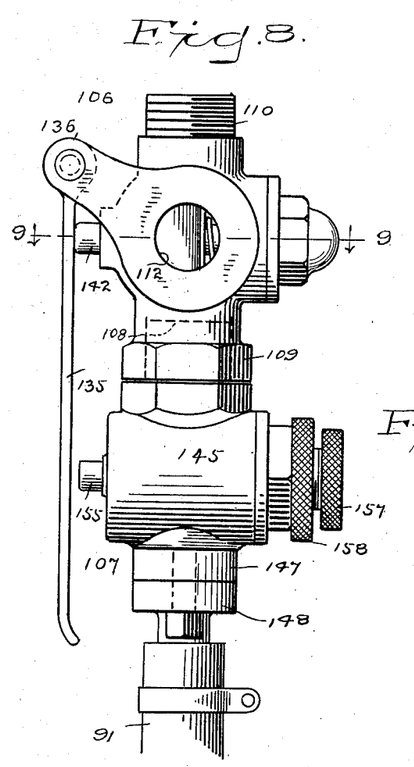
Fig. 8 an enlarged elevation of the vibrator and lifting valves detached.
Figure 9:
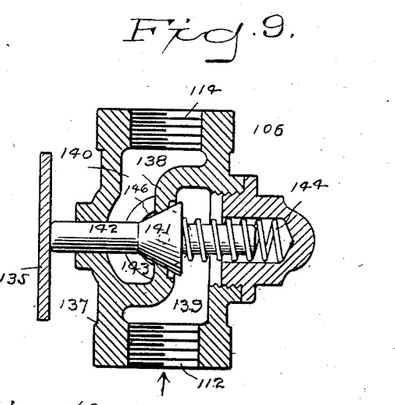
Fig. 9 a horizontal section of the vibrator valve on the line 9—9 in Fig. 8.
Figure 10:
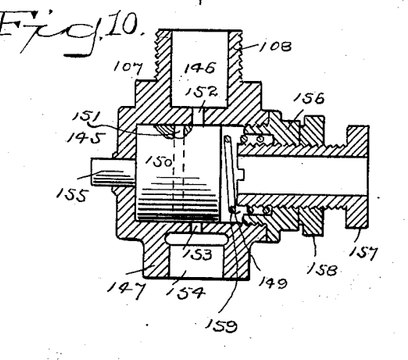
Fig. 10 a vertical section of the lifting valve detached.

105 denotes a pipe leading from chamber 100 to the vibrator and lifting valves, indicated respectively by 106 and 107 (see Figs. 8, 9 and 10 in connection with Fig. 1). It should be noted that the passage of air to pipe 105 is not controlled by the valve in chamber 100 which is operated by lever 102, but the pressure is always on in said pipe. The lifting valve is shown as secured to the vibrator valve by means of a threaded hub 108 which engages a hub 109 on the under side of the vibrator valve. The bodies of these valves are shown as made separate and secured together for convenience in manufacture. They may, however, be cast in a single piece if preferred. The two valves are secured in place by means of a threaded hub 110 on the vibrator valve which engages the under side of the table (see Fig. 8 in connection with Fig. 1). Pipe 105 is connected to the vibrator valve by means of a union 111 which is threaded to engage opening 112.

113 denotes a branched coupling which is connected to opening 114 in the vibrator valve (see Fig. 9 in connection with Fig. 1).

115 denotes a pipe leading from coupling 113 to a vibrator 116 located upon the flask frame and 117 denotes a pipe from said coupling to a vibrator 118 shown as located on the under side of the table. The branches of the coupling are each provided with a pet cock 119 controlling the passage of air to the vibrators so that either may be used independently or they may be used simultaneously. To produce a relatively light vibration, air is admitted to vibrator 118 on the table. To produce a relatively heavy vibration, air is admitted to vibrator 116 on the flask frame. Should still heavier vibration be required, owing to special conditions of use, both pet cocks would be opened and air admitted to both vibrators simultaneously.

The special form of vibrators used is immaterial so far as the present invention is concerned. I preferably use the style of vibrator illustrated in Fig. 11. The air pipe leading from coupling 113 (pipe 115 or 117) is connected to the vibrator by means of a suitable connection (not shown) engaging the vibrator at threaded opening 120.

Figure 11:
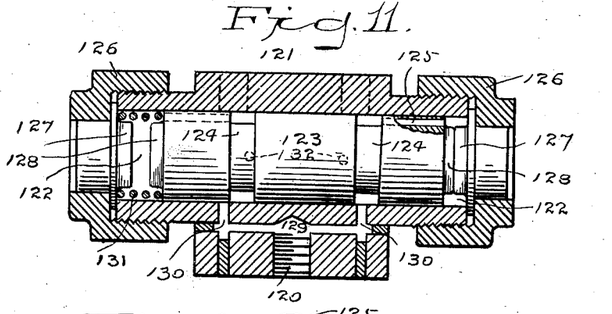
Fig. 11 a section of one of the vibrators detached.
Figure 12:
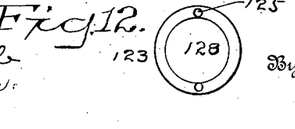
Fig. 12 is an end view of a vibrator piston.

121 denotes the body of a vibrator which is provided with a longitudinal opening 122. Within this opening is a double-ended piston 123 provided with circumferential grooves 124. From these grooves air passages 125 lead to the ends of the piston. At each end of the body is a head 127 retained in place by a screw cap 126 engaging the body. Each head 127 is adapted to be engaged by a corresponding head 128 on the contiguous end of the piston. Air entering at opening 120 enters a passage 129 from the opposite ends of which ports 130 lead to opening 122. A spring 131 bearing against one end of the piston and against one of the heads 127 acts to normally retain the piston at one extreme of its movement. As shown in Fig. 11, air will pass from the right port 130 to the right groove 124 in the piston, thence through the right passage 125 to the right end of opening 122 in the body. This will drive the piston toward the left, against the power of the spring, and cause the left head 128 to strike the left head 127. The air at the right end of opening 122 will exhaust through passage 125 and the right exhaust opening (see dotted lines indicated by 132) with which the right groove in the piston will now be in alinement. The left exhaust opening will be closed by the piston and air will now pass through the left port 130, groove 124 and passage 125 to the left end of opening 122, the piston will be driven toward the right and the right head 128 will strike the corresponding head 127 in the body. These movements are repeated with great rapidity and cause vibration of the body and the parts to which it is attached and separates the patterns from the molds.

135 denotes a knee plate which is pivoted between ears 136 extending from the vibrator valve. This knee plate is the operating means for both the vibrator and lifting valves. The special construction of the vibrator valve will be understood from Fig. 9, which is a horizontal section, and the special construction of the lifting valve will be understood from Fig. 10, which is a vertical section.

137 denotes the body of the vibrator valve, the interior of which is divided by a wall 138 into chambers 139 and 140.

141 denotes a valve disk carried by a stem 142 and engaging a seat 143 in wall 138. A spring 144 acts to normally hold the valve disk in engagement with the seat. The other end of the valve stem extends through the body into position to be engaged by the knee plate, as clearly shown in Fig. 9.

145 denotes the body of the lifting valve from which hub 108 extends. This hub, as already stated, engages hub 109 on the under side of the vibrator valve and the opening 146 in said hub communicates with chamber 140 in the vibrator valve. At the lower end of the lifting valve is a hub 147 to which a connection 148 for pipe 91 leading to coupling 90 is attached. Within body 145 is a chamber 149 which receives a valve 150 having an opening 151 through it. This opening is adapted to register with a passage 152 leading from opening 146 in hub 108 and with a passage 153 leading from central opening 149 to an opening 154 in hub 147.

155 denotes a stem extending from valve 150 and passing through the body into position to be engaged by the knee plate an instant after stem 142 of the vibrator valve is engaged as will be readily understood from Fig. 8.

156 denotes a screw cap which closes the end of chamber 149 opposite to the valve stem and 157 an adjusting plug or sleeve engaging a threaded opening in the cap. The adjustment of this plug or sleeve (a sleeve as shown in the drawing) limits the play of the valve and determines whether opening 151 shall register partially or wholly with openings 152 and 153. In other words, this adjustment determines whether the air shall pass slowly or quickly to the lifting cylinders through pipe 91 to produce a relatively slow or a relatively quick lifting motion. A lock nut 158 engaging the end of the cap retains the sleeve in position after adjustment and a spring 159 bearing against the valve and the base of the cap acts to retain the valve in the closing position, as in Fig. 10.

160 denotes a pipe leading from air chamber 100 and carrying a blowing nozzle which is normally retained in position by a catch 162 on the ramming board. This nozzle may be used to blow loose sand from the pattern plate after the flask is lifted. The air pressure in this pipe is not controlled by the valve in chamber 100 but the pressure is always on and is controlled by a pet cock 163 in the nozzle.

The operation is as follows: The operator swings the side bars, straining bar and ramming board backward, as indicated by dotted lines in Fig. 2. The patterns are placed on the pattern plate as in Fig. 6, the blowing nozzle being used if required, then the flask is placed in position on the flask frame as in Fig. 7 and filled with sand, and then the mold board is placed on the sand lying within the walls of the flask, and the side bars, straining bar and ramming board returned to position. The operator then swings the operating lever over toward the front, that is toward the left as shown in Fig. 2, the effect of which is to admit air through pipe 64 to the ramming cylinder and to raise the ramming cylinder, table, flask frame and flask and to force the mold board against the ramming board, thereby compacting the sand in the flask about the patterns to form half molds. If a relatively light ramming operation is desired, the catch upon the operating lever is engaged with the second notch in the segment. If a relatively hard ramming operation is required, the catch upon the operating lever is placed in engagement with the third notch in the segment. This opens the valve fully and permits the full quantity of air to pass to the ramming cylinder which raises said cylinder and the parts carried thereby with a quick movement and causes a hard ramming operation upon the sand in the flask. The ramming cylinder slides freely on the piston and piston rod which remain stationary. Either a relatively light or relatively hard ramming operation may be repeated as many times as may be required. After a ramming operation, the operator returns the operating lever to its normal position and the flask, flask frame, table and cylinder return to their normal position by gravity, the air in the cylinder exhausting through opening 66. It is of course well understood that two-part flasks are frequently used in the operation of molding, the upper part being termed a cope and the lower part a nowel. When a nowel is rammed the mold board is removed therewith and forms the bottom of the two-part flask in the operation of casting. After a ramming operation and the return of the cylinder to its normal position, the side bars, straining bar and ramming board are swung backward out of the way, as indicated by dotted lines in Fig. 2. The operator then presses upon the knee plate (either or both of the pet cocks being open), the action of which is to open the vibrator valve (see Figs. 8 and 9 in connection with Fig. 1), it being understood that the pressure is always on in pipe 105, which admits air to branched coupling 113 and through pipes 115 or 117 to one of the vibrators or to both of them, depending of course upon the character of the work that is being done. The effect of the operation of a vibrator is to separate the patterns from the molds so that the sand will not adhere to them but without injury to the molds. An instant later the knee plate will operate the lifting valve (see Figs. 8 and 10 in connection with Fig. 1). The operation of the lifting valve permits air to pass through pipe 91 to coupling 90, and thence through pipes 80 to the lifting cylinders (see Fig. 7), the effect of which is to raise the lifting cylinders and by means of the two-part lifting pins to raise the flask away from the pattern plates and patterns, disengaging plates 26 from the dowel pins. The operator then relieves the pressure on the knee plate, which permits the lifting valve to be closed instantly by the spring. This shuts off the air pressure in the lifting cylinders which fall slowly by gravity, the air escaping around the pistons which are not packed. As already explained, the amount of air pressure in the lifting cylinders is regulated by adjustment of plug or sleeve 157 in the lifting valve, the lifting operation being performed relatively slowly or quickly depending upon the amount of air admitted to the lifting cylinders. As already explained, a vitally important feature of the present invention is that the lifting operation is effected by pneumatic or steam power and that both ends of the flask are caused to rise evenly; that is, the flask is raised by a steady, even application of power to both ends thereof so that there can be no binding, no jarring nor anything that can injuriously affect the molds. The flask is now removed, a new flask placed in position, the blowing nozzle used if required and the operations repeated as before.

Having thus described my invention I claim:

1. In a machine of the character described, the combination with a flask frame and lifting cylinders, of two-part lifting pins, one part of each pin being socketed in the flask frame and air connections whereby said cylinders and pins are raised to lift a flask from the flask frame.

2. In a machine of the character described, the combination with a fixed frame for carrying a flask while ramming, of lifting cylinders and two-part lifting pins and air connections whereby said cylinders and pins are raised to lift the flask from the flask frame.

3. In a machine of the character described, the combination with a table and an independent flask frame resting thereon, of a flask and laterally adjustable lifting mechanism therefor partly supported by and moving independently of the flask frame.

4. In a machine of the character described, the combination with a table and an independent flask frame resting thereon, of a pattern plate resting on the flask frame, a flask also resting on the flask frame and laterally adjustable lifting mechanism for the flask, partly supported by the flask frame, whereby the flask is raised away from the flask frame and the pattern plate.

5. In a machine of the character described, the combination with a table having slots, a flask frame, laterally adjustable lifting cylinders and air connections whereby said cylinders are raised, of lifting pins comprising two parts in alinement, the upper parts of said pins being socketed in the flask frame and the lower parts rigidly secured to the lifting cylinders and extending through the slots in the table, substantially as described, for the purpose specified.

6. In a machine of the character described, the combination with a ramming cylinder, an air connection thereto and lifting pistons laterally adjustable relatively to the ramming cylinder, of lifting cylinders, a rock shaft mounted on the ramming cylinder and arms laterally adjustable on the rock shaft and having slotted connections to the lifting cylinders, substantially as described, for the purpose specified.

7. In a machine of the character described, the combination with a table having depending arms, a ramming cylinder, air connections thereto and bars whose ends are secured to the ramming cylinder and arms respectively, of lifting pistons laterally adjustable on said bars, lifting cylinders, air connections thereto and adjustable swinging connections between the lifting cylinders and the ramming cylinder.

8. In a machine of the character described, the combination with a ramming cylinder, lifting cylinders and vibrating mechanism, of an air connection to the ramming cylinder, air connections to the vibrating mechanism and the lifting cylinders, a swinging knee plate and vibrator and lifting valves having stems adapted to be engaged successively by the knee plate to first actuate the vibrating mechanism and to then raise the lifting cylinders.

9. In a machine of the character described, the combination with lifting cylinders, and vibrating mechanism, of a vibrator valve having a chamber to which air is admitted when the valve is operated, connections from said chamber to the vibrating mechanism and to the lifting valve, connections from the lifting valve to the lifting cylinders and means for operating said valves successively.

10. In a machine of the character described, the combination with lifting cylinders and vibrating mechanism, of a vibrator valve, air connections to said valve and from said valve to the vibrating mechanism, a lifting valve connected to the vibrator valve and receiving air therefrom, air connections to the lifting cylinders and means for regulating the amount of air that can pass to the lifting cylinders when the lifting valve is operated.

11. In a machine of the character described, the combination with a straining bar and a pivoted side bar, of an oscillating sleeve, a weight carried thereby and arms extending from said sleeve and engaging the side bar on opposite sides to retain the straining bar in operative position.

12. In a machine of the character described, the combination with a straining bar and a pivoted side bar, of an oscillating sleeve, an adjustable weight carried thereby and arms extending from said sleeve, one of which carries a roller which engages the back of the side bar and the other a stop which is engaged by the front of the side bar when the latter is returned to its normal position.

13. In a machine of the character described, the combination with a straining bar and a pivoted side bar, of an oscillating sleeve having three arms extending therefrom, one of said arms carrying an adjustable weight which counterbalances the straining bar and side bar, the second arm carrying a flanged roller engaging the back of the side bar and the third arm having a projection provided with a set screw which engages the front of the arm to limit the return movement thereof.

14. In a machine of the character described, the combination with a ramming cylinder, lifting cylinders on opposite sides thereof and means for adjusting the lifting cylinders relatively to the ramming cylinder, of air connections to said cylinders and independent means for controlling the passage of air to the ramming cylinder and to the lifting cylinders.

15. In a machine of the character described, the combination with a ramming cylinder, lifting cylinders, lifting pistons and means for adjusting the lifting cylinders and lifting pistons laterally, of means for conveying air to said cylinders and means for insuring even rise of the lifting cylinders.

16. In a machine of the character described, the combination with a ramming cylinder, lifting cylinders and swinging connections between the lifting cylinders and the ramming cylinder, of lifting pistons, means for adjusting the swinging connections and the lifting pistons laterally and air connections to said cylinders.

17. In a machine of the character described, the combination with a table having slots, a flask frame and lifting cylinders, of two-part lifting pins the upper portions of which are socketed in the flask frame and the lower portions of which are secured to the lifting cylinders and pass through the slots in the table, and air connections to the lifting cylinders.

18. In a machine of the character described, the combination with lifting cylinders and vibrating mechanism, of air connections to said cylinders and to the vibrating mechanism, independent valves for controlling the passage of air to the vibrating mechanism and to the cylinders and a knee plate for successively operating said valves.

In testimony whereof I affix my signature, in presence of two witnesses.

C. EDWIN A. THOMPSON.

Witnesses:
A. M. Wooster,
S. W. Atherton.